United States Patent
Ademe et al.

(10) Patent No.: US 9,903,784 B2
(45) Date of Patent: Feb. 27, 2018

(54) TESTING STAND WITH THUMPING ASSEMBLY

(71) Applicant: R. J. Reynolds Tobacco Company, Winston-Salem, NC (US)

(72) Inventors: Balager Ademe, Winston Salem, NC (US); John Larkin Nelson, Lewisville, NC (US)

(73) Assignee: R.J. REYNOLDS TOBACCO COMPANY, Winston-Salem, NC (US)

( * ) Notice: Subject to any disclaimer, the term of this patent is extended or adjusted under 35 U.S.C. 154(b) by 237 days.

(21) Appl. No.: 14/789,429

(22) Filed: Jul. 1, 2015

(65) Prior Publication Data

US 2017/0003193 A1    Jan. 5, 2017

(51) Int. Cl.
  *G01M 7/00*  (2006.01)
  *G01M 7/08*  (2006.01)
  *A24F 47/00* (2006.01)

(52) U.S. Cl.
  CPC .............. *G01M 7/08* (2013.01); *A24F 47/00* (2013.01)

(58) Field of Classification Search
  CPC ........... G01M 7/08; A24F 47/00; A24F 37/00; A24F 37/002; G01N 3/307; A24C 5/34; A24C 5/3418; A24C 5/343; A24C 5/345
  USPC ..... 73/12.09, 12.01, 12.11, 12.12, 28.01, 41, 73/45.1, 45.2, 23.3, 37
  See application file for complete search history.

(56) References Cited

U.S. PATENT DOCUMENTS

| | | | |
|---|---|---|---|
| 3,204,449 A | 9/1965 | Fordyce | |
| 3,363,452 A | 1/1968 | Mcarthur | |
| 3,426,582 A | 2/1969 | McArthur et al. | |
| 3,460,374 A | 8/1969 | Parks | |
| 3,528,435 A | 9/1970 | Morrissey | |
| 3,564,902 A | 2/1971 | Heitmann | |
| 4,019,366 A * | 4/1977 | Claflin | A24C 5/3406 131/330 |
| 4,034,600 A | 7/1977 | Motte | |
| 4,142,534 A | 3/1979 | Brantl | |
| 4,184,360 A | 1/1980 | Vadnay et al. | |
| 4,858,628 A * | 8/1989 | Norman | A24C 5/3406 131/329 |
| 7,021,125 B2 * | 4/2006 | Focke | A24C 5/343 73/81 |
| 2003/0145868 A1 * | 8/2003 | Halder | G01N 1/26 131/329 |
| 2007/0102015 A1 * | 5/2007 | Villarinho | B65B 69/00 131/282 |
| 2008/0257368 A1 * | 10/2008 | Wilson | A24C 5/3406 131/328 |
| 2013/0061861 A1 | 3/2013 | Hearn | |

FOREIGN PATENT DOCUMENTS

| | | | |
|---|---|---|---|
| DE | 3423947 | 1/1986 | |
| FR | 2258134 | 8/1975 | |
| WO | WO 2016046567 | * 3/2016 | ............... A24C 5/34 |

\* cited by examiner

*Primary Examiner* — Harshad R Patel
*Assistant Examiner* — Nigel Plumb
(74) *Attorney, Agent, or Firm* — Middleton Reutlinger

(57) ABSTRACT

A testing device is provided which can provide a testing force to smoking articles of various types, in order to determine if ash breakage is appropriate or if the heating element of a heat not burn smoking article becomes loose under normal working conditions.

20 Claims, 8 Drawing Sheets

TESTING STAND WITH THUMPING ASSEMBLY

CLAIM TO PRIORITY

None.

BACKGROUND

Field of the Invention

Present embodiments relate to a testing stand for smoking articles. More specifically, present embodiments relate to a testing stand with a thumping device for testing smoking articles including, but not limited to, heat not burn type smoking articles.

During smoking, one habit of smokers is to tap the cigarette on a surface, edge or within an ashtray or other edge or surface to cause the burned ash to fall off. This happens so often that the act nearly becomes an unconscious act.

A more recent development in smoking article technology is referred to as the heat not burn cigarette. Heat not burn articles use a heating element, such as carbon based element, to heat but not burn tobacco. Even with smoking these articles, and despite the lack of an ash on the end of the smoking article, smokers still tend to tap the article during use to simulate the act of breaking a long ash.

However, this act has been found to be detrimental in some instances, as it can cause the heating element of the heat not burn article to loosen and potentially fall from the article.

It would be desirable to create a device, apparatus or mechanism which can test the ash breakage of a normal cigarette or other tobacco burning article to determine if ash breakage is occurring normally during the smoking process. Further, it would be desirable to test heat not burn smoking articles to ensure that heating elements are not loosening during tapping which may also occur during the use of the heat not burn smoking article. Still further, it would be desirable to provide a test stand which may also be used to test air draw through a smoking article.

The information included in this Background section of the specification, including any references cited herein and any description or discussion thereof, is included for technical reference purposes only and is not to be regarded subject matter by which the scope of the invention is to be bound.

SUMMARY

According to some embodiments, a testing device is provided which can provide a testing force to smoking articles of various types, in order to determine if ash breakage is appropriate or if the heating element of a heat not burn smoking article becomes loose under normal working conditions.

A smoking article testing assembly comprises a frame, at least one smoking article holder which holds one or more cigarettes, at least one valve which is in vacuum communication with said smoking article holder, an actuator to thump a smoking article and, a thumper bar operably connected to the actuator, the thumper bar movable to tap the one or more smoking articles in the at least one smoking article holder.

Optionally, the actuator being a linear actuator or may be a rotary actuator which produces linear motion. The actuator being a single acting actuator or may be a dual acting actuator. The thumper may move at an angle of between 45 degrees and 135 degrees to the smoking articles. The actuator may be disposed adjacent to the at least one holder. The smoking article testing assembly may further comprise a seat for the smoking article, the seat having a spring for the one or more smoking articles. The frame may have an actuator support and the actuator support may be disposed adjacent to the smoking article holder. The actuator may be disposed on the actuator support. The thumper bar may move with movement of the actuator. The one or more smoking articles may be heat not burn tobacco or may be cigarettes.

According to further embodiments, a smoking article testing assembly comprises a frame formed of at least one frame element, a thumper assembly including a mount and an actuator disposed adjacent to a smoking article holder, a first flow circuit in flow communication with the smoking article holder for placing a vacuum on a smoking article, and, at least one second flow circuit which powers said actuator to thump said smoking article, the cigarette holder being movable toward or away from an igniter.

Optionally, the smoking article testing assembly may further comprise a second actuator to move the cigarette holder. Further, a floor may move with the second actuator. The smoking article testing assembly may further comprise a seat for the smoking article disposed on the floor wherein actuation of the second actuator moves the seat and the cigarette holder.

According to some embodiments, a smoking article testing assembly comprises a frame having at least one frame element, a first actuator which moves at least a cigarette holder, a second actuator which is connected to a thumper bar and thumps a smoking article when actuated, the cigarette holder applying a vacuum to the smoking article, the at least one frame element guiding movement of the cigarette holder when the first actuator actuates. All of the above outlined features are to be understood as exemplary only and many more features and objectives of a testing stand with thumping device may be gleaned from the disclosure herein. Therefore, no limiting interpretation of this summary is to be understood without further reading of the entire specification, claims and drawings, included herewith.

BRIEF DESCRIPTION OF THE DRAWINGS

In order that the embodiments may be better understood, embodiments of the testing stand with thumping assembly will now be described by way of examples. These embodiments are not to limit the scope of the claims as other embodiments of the testing stand with thumping assembly will become apparent to one having ordinary skill in the art upon reading the instant description. Non-limiting examples of the present embodiments are shown in figures wherein:

DETAILED DESCRIPTION

Figure 1:
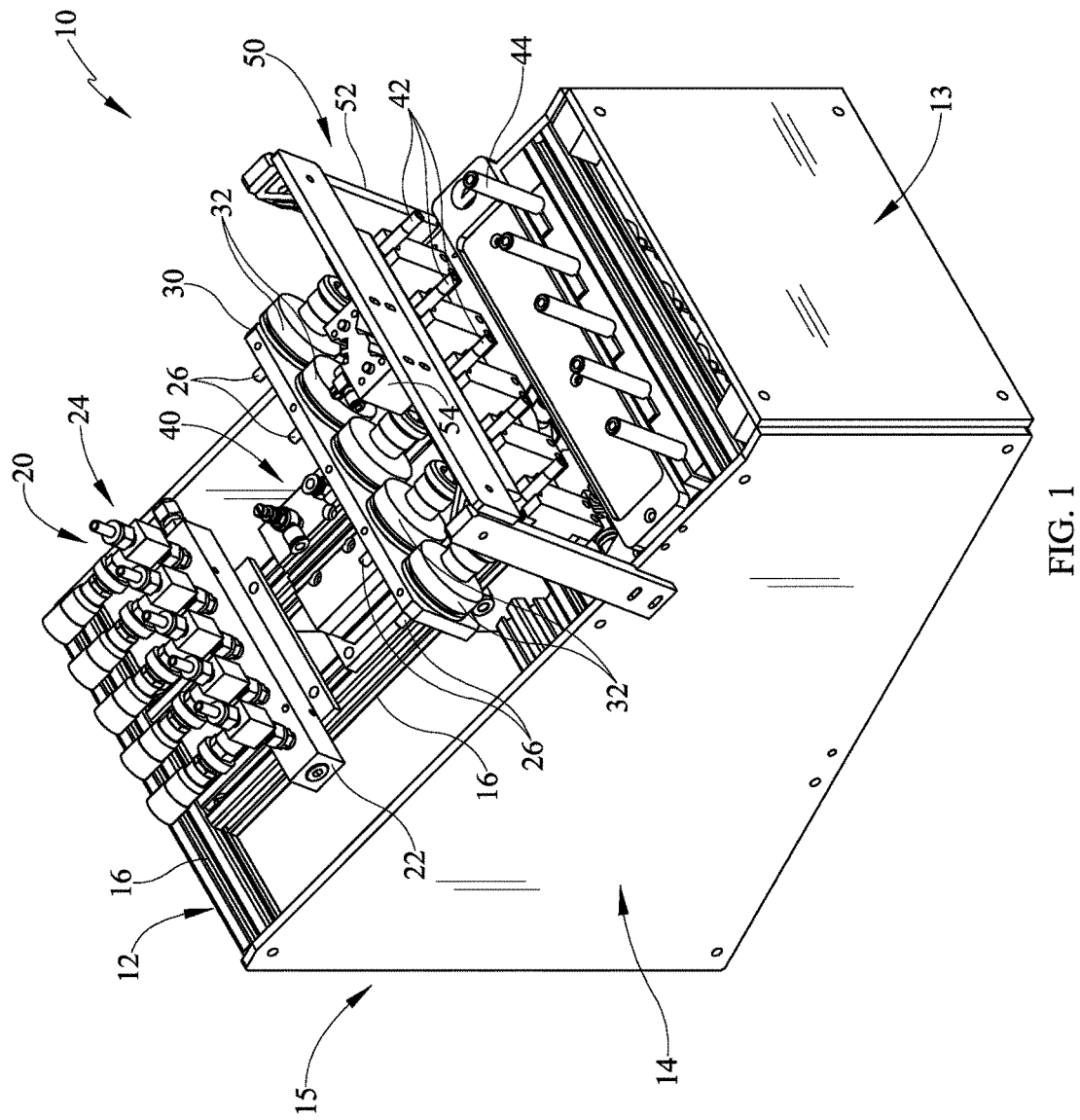
FIG. 1 is a perspective view of a testing stand with thumping assembly for smoking articles.

It is to be understood that the testing stand with thumping assembly is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now to FIGS. 1-8, various embodiments of a testing assembly are provided which provide for testing of smoking articles, both tobacco burning and tobacco heating. The testing assembly simulates smoking of the article by drawing air through the smoking article. Further, the assembly applies a thumping force similar to the tapping that occurs when trying to break an ash of a burning smoking article or when as generally may occur with a heat not burn smoking article, out of habit. The testing assembly may therefore test the smoking article to simulate smoking and to simulate thumping, for example to ensure that the heat element does not loosen during the thumping application of force.

Referring now to FIG. 1, a perspective view of a testing stand with thumping assembly 10 for a smoking article is provided. The testing stand 10 functions to test tobacco burning smoking article or heat not burn smoking article by retaining the smoking article and igniting the smoking article or heating element, and drawing air through the smoking article as would normally be done by a user. Further, however, the testing stand 10 provides a thumper assembly which provides a force on the smoking article which corresponds to a normal finger tapping during an ash-tapping bump that a user would perform on the cigarette.

The term smoking article refers to various types of smokable articles, including but not limited to tobacco burning cigarettes and cigars, including heat not burn type smoking articles which heat the tobacco, e-cigarettes, vapor-type smoking devices, pipes and may include other smoking articles of various natures.

As shown in the FIG. 1, there is shown a testing stand with thumper assembly 10 wherein one or more smoking articles 42 may be positioned for testing. The testing stand with thumper assembly 10 includes a frame 12 which may be fully or partially surrounded by a housing 14. The frame 12 may be formed of one or more structural elements 16 to provide support for various components of the testing assembly 10. The frame 12, with or without the housing 14, may also allow the assembly 10 to be self-supporting. As shown in the depicted embodiment, the frame structural elements 16 define a plurality of slide channels wherein positions of components of the testing stand with thumper assembly 10 may be adjustably moved. As opposed to channels, the structural elements may be formed of ribs or protuberances, continuous or discontinuous, which guide sliding motion.

The testing stand with thumper assembly 10 provides several functions. First, the testing stand with thumper assembly 10 retains the one or more smoking articles in position for testing. Second, the testing stand with thumper assembly 10 provides a negative pressure or vacuum to simulate draw on the article during smoking. Third, the testing stand with thumper assembly 10 may ignite the smoking article or heating element, for example carbon within the smoking article, if necessary and depending on the type of article being tested. Finally, the testing stand with thumper assembly 10 applies a force or testing acceleration on the smoking article to simulate the tapping which occurs when a user taps the smoking article during normal use.

Figure 2:
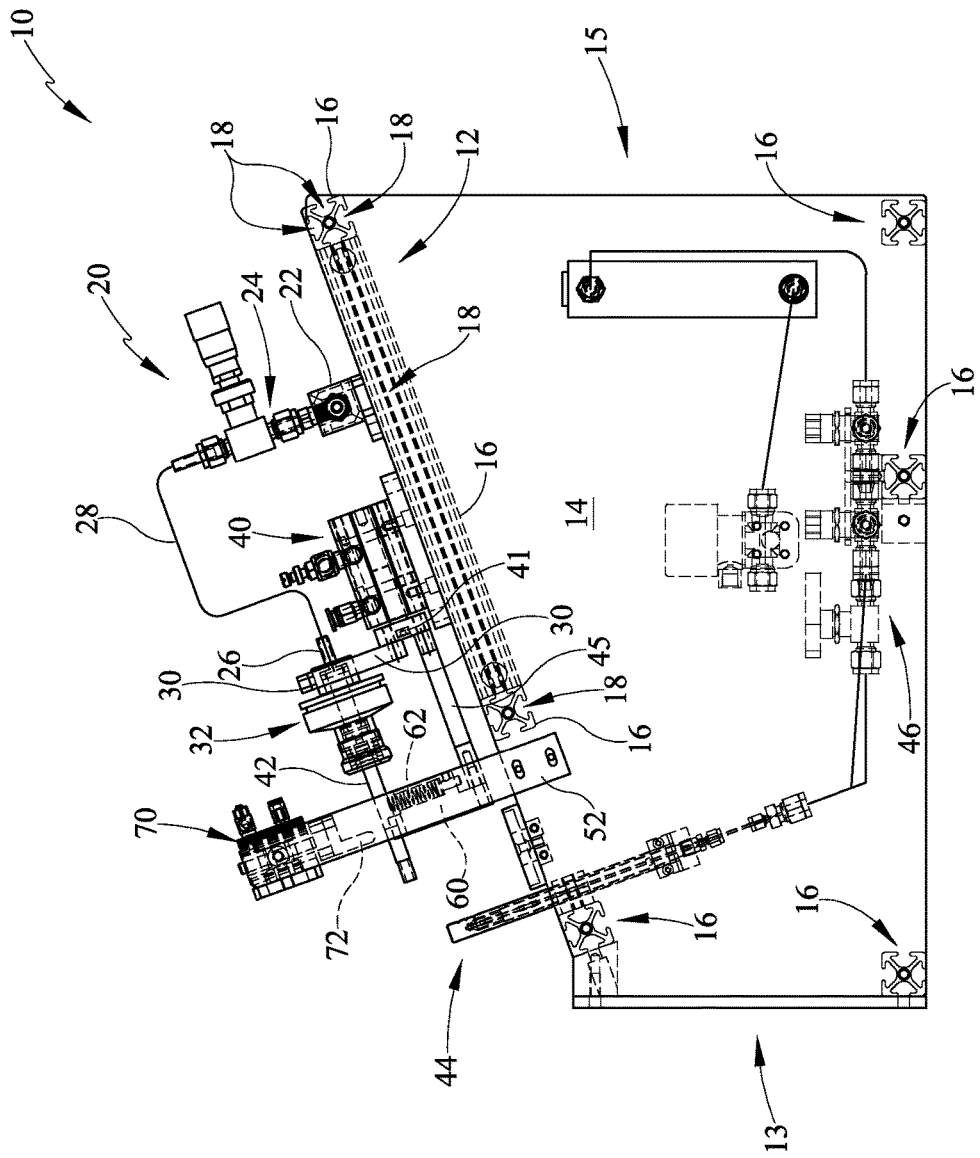
FIG. 2 is a side view of the assembly of FIG. 1.

With reference now to both FIGS. 1 and 2, which shows a side view of the testing assembly 10, near one end of the testing assembly 10 are portions of a draw assembly 20. As indicated previously, one function of the assembly 10 is to place a draw or vacuum on the smoking articles to test the air flow through the article during simulated smoking. Near the upper end of the frame 12 is a manifold 22 which is in negative flow communication with a plurality of valves 24. There may be one or more valves 24 corresponding to the number of smoking articles capable of being tested at one time, according to some exemplary embodiments. However, valves 24 may alternatively be plumbed in such a manner that one valve may place a draw one or more smoking articles. The manifold 22 and valves 24 are in flow communication with smoking article holders 32 and a vacuum generator to define a first flow circuit which draws air through the smoking articles 42.

The valves 24 are in flow communication with tube connectors 26 by flow tubes 28 (FIG. 2). The tubes 28, which are shown schematically, may be ¼" inner diameter Tygon® tube in some embodiments which is commercially available from Saint-Gobain Performance Plastics. Other sizes and types of materials may be utilized depending on flow volumes and/or other characteristics. The tube connectors 26 are in flow communication with a plate 30 providing a position for seating of each of the tube connectors 26. The tubes 28 may be longer than the distances between connectors 26 and valves 24 to accommodate movement between the parts, described further herein.

Disposed between the manifold 22 and the plate 30 is an actuator 40. The actuator 40 is provided to move the plate 30 along the frame 12. As previously mentioned, the frame 12 includes structural elements 16 which allow for slidable movement of components of the test stand 10. In this embodiment, the frame 12 has a front 13 and rear 15. The frame 12 includes at least one structural element 16 extending from near the front to near the rear. In the instant embodiment, two structural elements 16 extending between the front and rear of the testing stand 10. The structural elements 16 define at least one guide 18 to direct movement of a component. In the instant embodiment, the at least one guide 18 may extend in the front to rear direction and may be on the top surface of the structural element 16 or may be on a bottom or side surface. The guide 18 may be male or female and may be continuous or discontinuous.

Referring again to the actuator 40, the actuator 40 may be fixed on the test stand 10 and may actuate the smoking article 42 toward or away from an igniter 44. In other embodiments, a cigarette holder 32 may be actuated toward or away from the smoking article 42 to draw air or stop the draw of air. The igniter 44 may be fueled by a fuel source, for example butane, and cause ignition of the smoking article 42.

The actuator 40 may be powered by compressed air for example or other fluid powered actuator. In the instant embodiment, the actuator 40 may be a linear actuator 40 to move the plate 30 from the position shown closer to the igniters 44. The fluid power may be started or stopped by, for example, an electric solenoid to open or close the air lines in communication with the actuator 40. On the upper surface of the actuator are valves which provide connections for fluid flow through the actuator 40.

The actuator 40 may be fluid powered for movement in two directions or may be normally biased to a first position and fluid powered to move to a second position. For example, double acting, single acting or other linear actuators may be utilized. Further, for example, rotary actuators may be utilized to produce a linear motion if desirable.

Mounted to the plate 30 are a plurality of cigarette holders 32. For example, the exemplary holders 32 may be Cambridge cigarette holders which allow air draw and include an internal filter which may be analyzed for testing of filtered material. Each cigarette holder 32 is in fluid communication with the connectors 26 and conduit 28 so that a vacuum is pulled though the cigarette holders 32. The vacuum or draw is then transmitted through the smoking article 42.

The amount of air flow through the smoking article may vary. However, according to some embodiments, the draw of air may be three (3) seconds with a volume of 20 cc/second for a total of 60 cc/3 seconds. The valves 24 may be adjustable to restrict the flow therethrough or alternatively stated, control the amount of flow through the draw assembly 20.

Extending from the housing 14 and disposed above the cigarettes 42 is a thumper assembly 50. The thumper assembly 50 includes at least one mount 52. A thumper actuator 54 is disposed on the mount 52 to move a thumper bar 72 up and down relative to the smoking articles 42. The thumper bar 72 engages the smoking articles 42 to simulate a tapping which would occur during normal use. At least a second flow circuit is defined by the fluid flow through one of both of the actuators 40, 54 to control movement of the actuators and connected parts, as desired.

Referring now to FIG. 2, a side view of the test stand with thumper assembly 10 is shown. In this view the housing 14 is shown and the frame 12 is shown in broken line. The frame 12 is formed of a plurality of structural elements 16. The structural elements 16 may comprise a number of slide rails, channels or guides 18. These structures may be male or female and guide movement of one or more components mounted on the frame 12.

At the right hand side of the figure, the manifold 22 is disposed on the frame 12 and a valve 24 is connected to the manifold 22. A single valve 24 is shown but the draw assembly 20 may include a plurality of valves. The manifold 22 and the one or more valves 24 are in flow communication with a vacuum generator (not shown) which draws air though the cigarette holder 32. The vacuum generator may be in flow communication with the manifold 22, one or more valves 24 and the one or more holders 32.

Also shown in this view is a seat 60 for the smoking articles 42. The lead line for the seat 60 is shown in broken line since the seat is disposed behind the thumper mount 52 in the depicted embodiment.

Disposed above the smoking articles 42 is a thumper actuator 70. The actuator 70 may also be in flow communication with a fluid source, as described with actuator 40. For example the actuator 40 may include first and second valves allowing, for example, compressed air to move therethrough. A thumper bar 72 is also disposed above the smoking article and connected to the thumper actuator 70. The thumper bar 72 moves up and down engages the smoking article 42 below. The seat 60 may include a spring 62 or other structure which absorbs some of the load that the thumper bar 72 creates. The spring 62 may also provide upward force on the smoking article 42 to return the smoking article 42 to a pre-thump location, better positioning the smoking article 42 for improved engagement with the thumper bar 72.

At the left hand end of the test stand 10 is an igniter 44. The igniter 44 is adjacent to the smoking articles 42 so that a flame created by the igniters 44 can either ignite the tobacco of a cigarette or, in the instance of a heat not burn smoking article, the igniter may ignite carbon or other such heating element so that the heating element can heat but not burn the tobacco.

Beneath the igniter 44 is a transmission conduit 46 which transmits butane or other flammable fluid to the igniter 44. The transmission conduit 46 may also include valves and other fittings as needed for regulating and safely transmitting the flammable fluid to the igniter 44.

Figure 3:
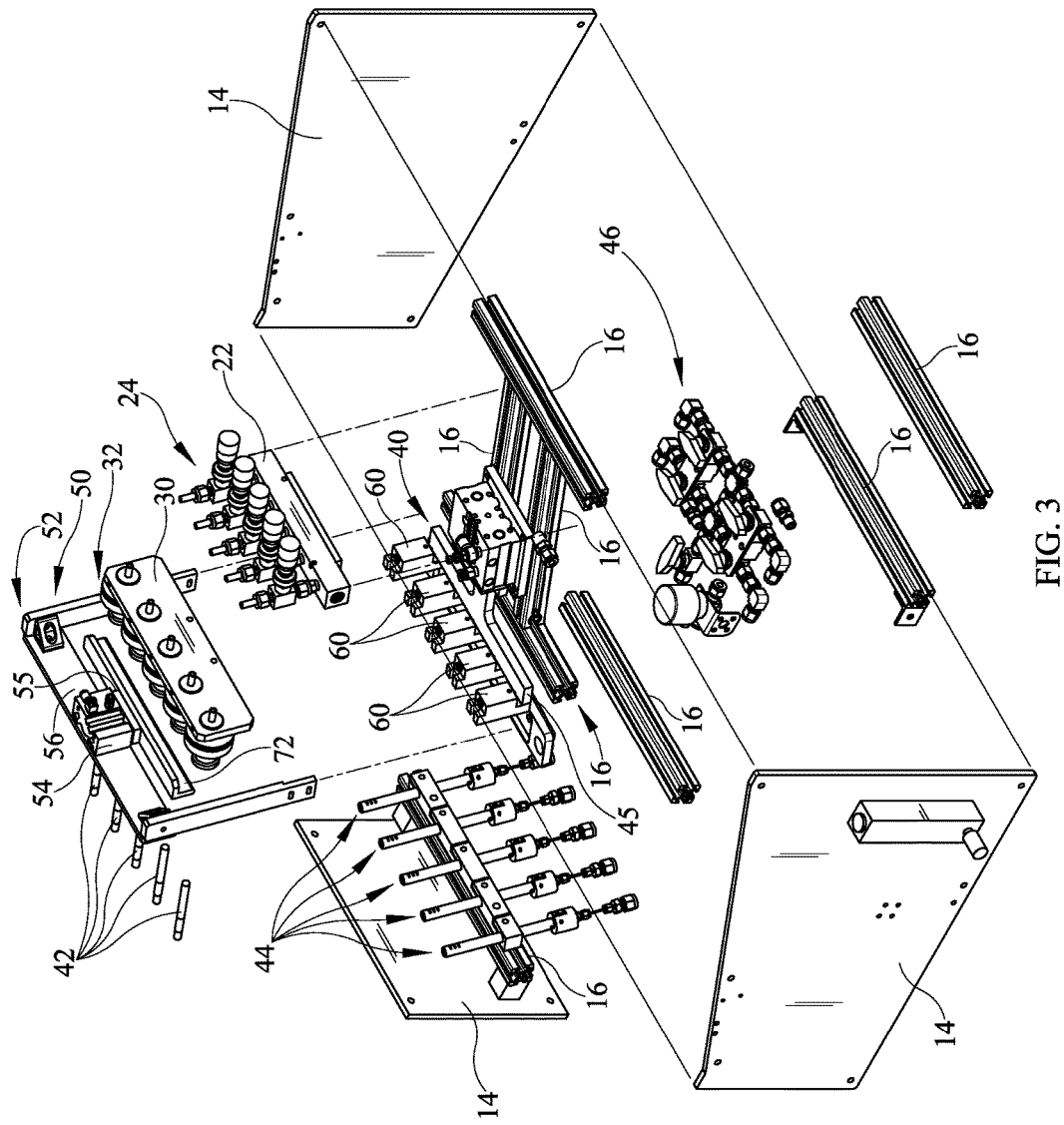
FIG. 3 is an exploded perspective view of the components and subassemblies of the assembly of FIG. 1.

Referring now to FIG. 3, the test stand with thumper assembly 10 is shown in exploded perspective view. The test stand 10 includes the frame 12 which may comprise a plurality of structural elements 16. The frame 12 is connected to the housing 14 which may disposed on one or more sides of the test stand with thumper assembly 10. It is also within the scope of the invention that the stand 10 be formed only of a housing structure or only of the frame 12, which may be one or more frame elements 16.

The thumper assembly 50 may include one or more mounts 52 which connect the thumper assembly to the frame 12 or housing 14. The mount 52 may be a one-piece structure or formed of multiple structures which are connected or otherwise joined together. As shown in the instant view, the mount 52 is formed of multiple bars, such as flat stock in form, and joined in the form of a U-shaped structure which extends above the seats 60 and holders 32 wherein the smoking articles 42 are positioned.

The mount 52 includes a cross-member 56 which extends above the seats 60 and which supports the thumper actuator 54. A piston or arm 55 extends from the thumper actuator 54 and may move to extend or retract. The arm 55 is connected to the thumper bar 72 to apply a force or acceleration on the smoking article 42. In some embodiments, the thumper bar 72 may be integrally formed on the bar 55.

In the instant embodiment, and with brief additional reference to FIG. 2, the thumper bar 72 has an L-shaped cross section wherein one leg of the L is connected to the arm 55 and the other leg of the L thumps or taps the smoking articles 42. The thumper bar 72 may be formed in other cross-sectional shapes and is not limited to the embodiment shown.

The actuator 54 is shown above the holder 32 and seat 60 but may tap from below or from a side. Further, the actuator 54 may also move in a direction perpendicular to the smoking article 42 or at an angle to the axis of the smoking article. For example, the actuator 54 may move at an angle of between about 45 degrees and 135 degrees relative to an axis of the smoking article 42.

Still further, and with reference again to FIGS. 1-3, the actuator 40 includes an arm 41 which extends from the actuator 40 and is connected thereto. The arm 41 may be connected to the plate 30 to move the cigarette holder 32 and may or may not be connected to the seats 60 to move the seats 60 if connected. For example, the seat 60 may move if the smoking article moves with the holder 32. Alternatively, if the seat 60 is not connected, the holder 32 may move to engage the smoking article 42 to puff or draw air through the smoking article 42 or move away from the seat 60 to preclude puffing or drawing of air through the smoking article 42. In the instant embodiment, the seat 60 is positioned on a floor 45 which moves with the arm 41. Accordingly in the instant embodiment, the plate 30, the floor 45, the seat 60 and the holder 32 may all move with actuation of the arm 41.

Figure 4:
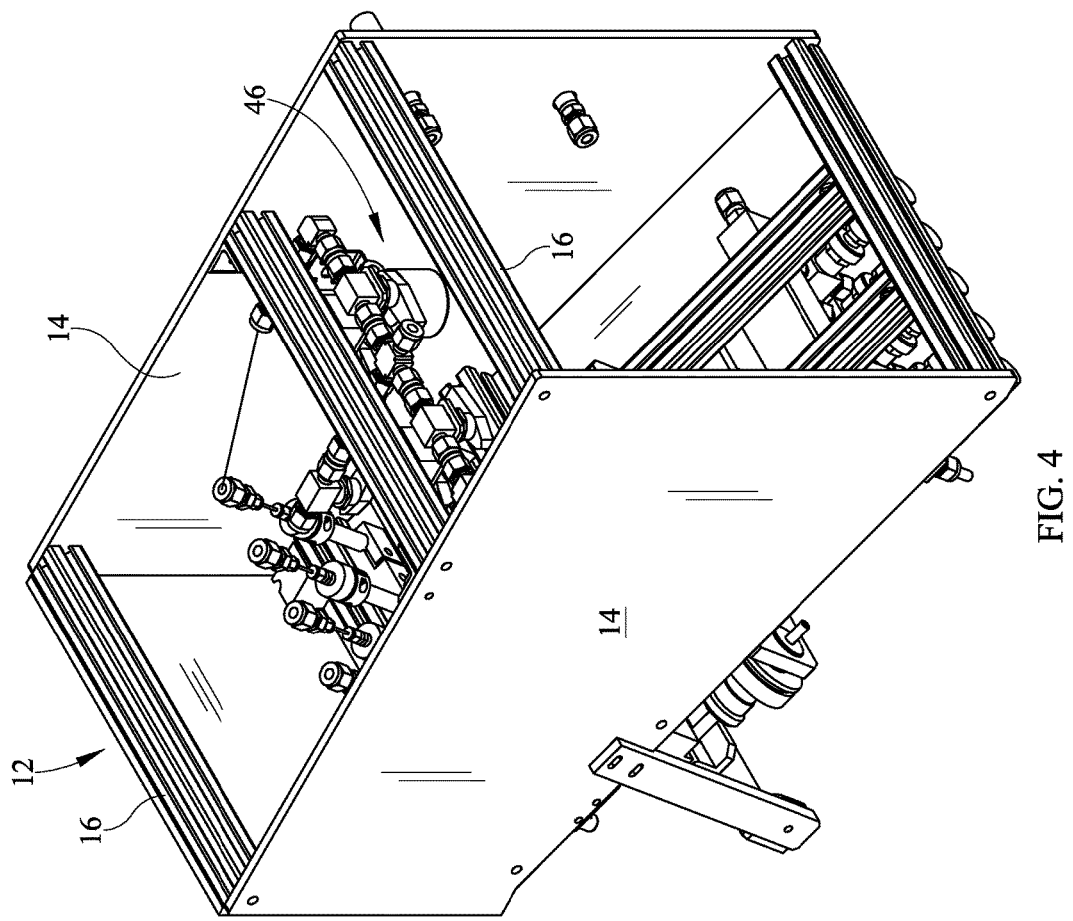
FIG. 4 is a bottom perspective view of the assembly of FIG. 1.

With reference now to FIGS. 3-4, beneath the frame 12 is a fuel supply plumbing arrangement 46. The structure is exemplary and may include various valves, piping and fittings in order to supply a fuel supply, such as butane, to the igniters 44.

Figure 5:
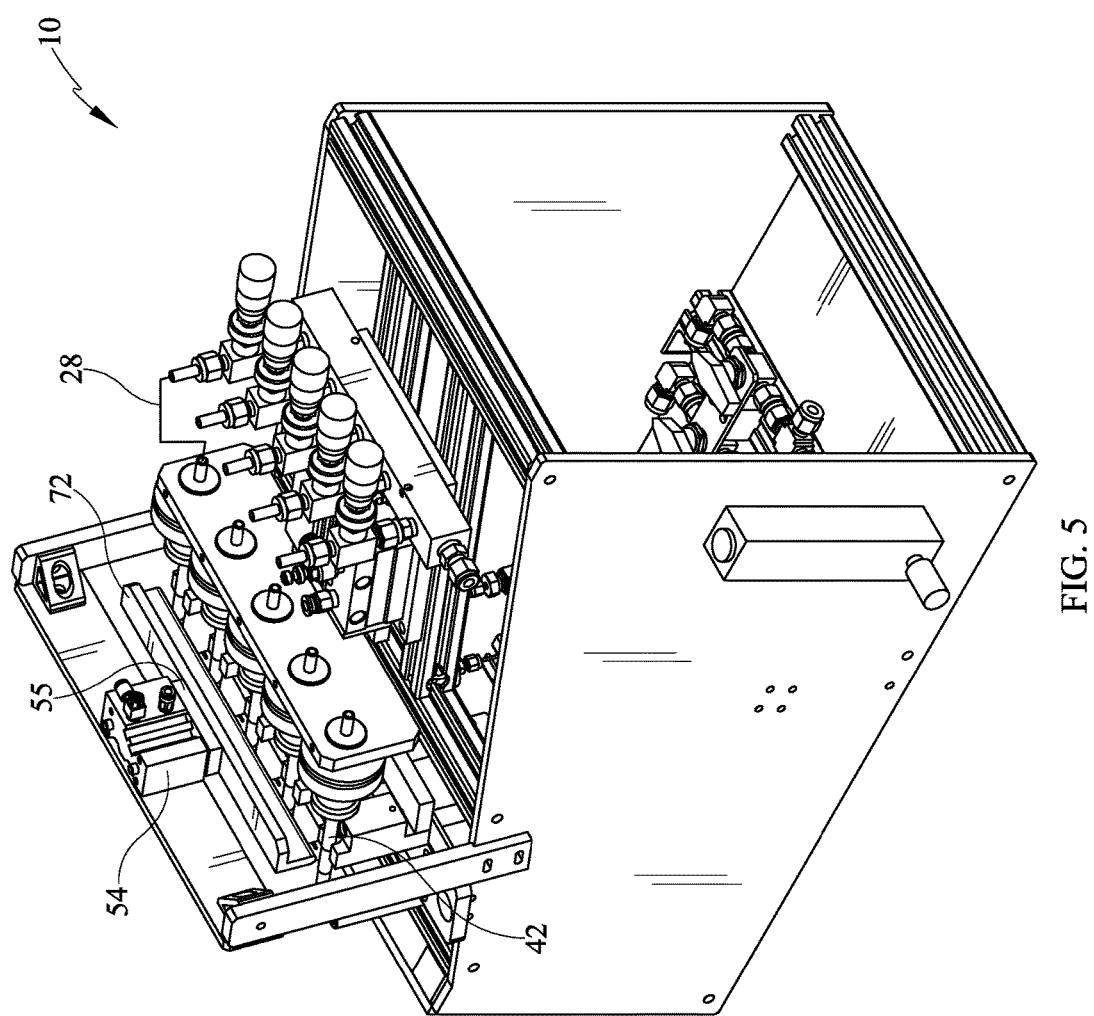
FIG. 5 is a first perspective view of a thumper device in operation in a first position.

Referring now to FIG. 5, a perspective view of the testing stand with thumper assembly 10 is shown. In this embodiment, the thumper actuator 54 is shown in a retracted position. The piston 55 is retracted and the thumper bar 72 is spaced from the smoking articles 42 below. In this position, for example, the testing stand 10 may draw air through the smoking articles 42.

Figure 6:
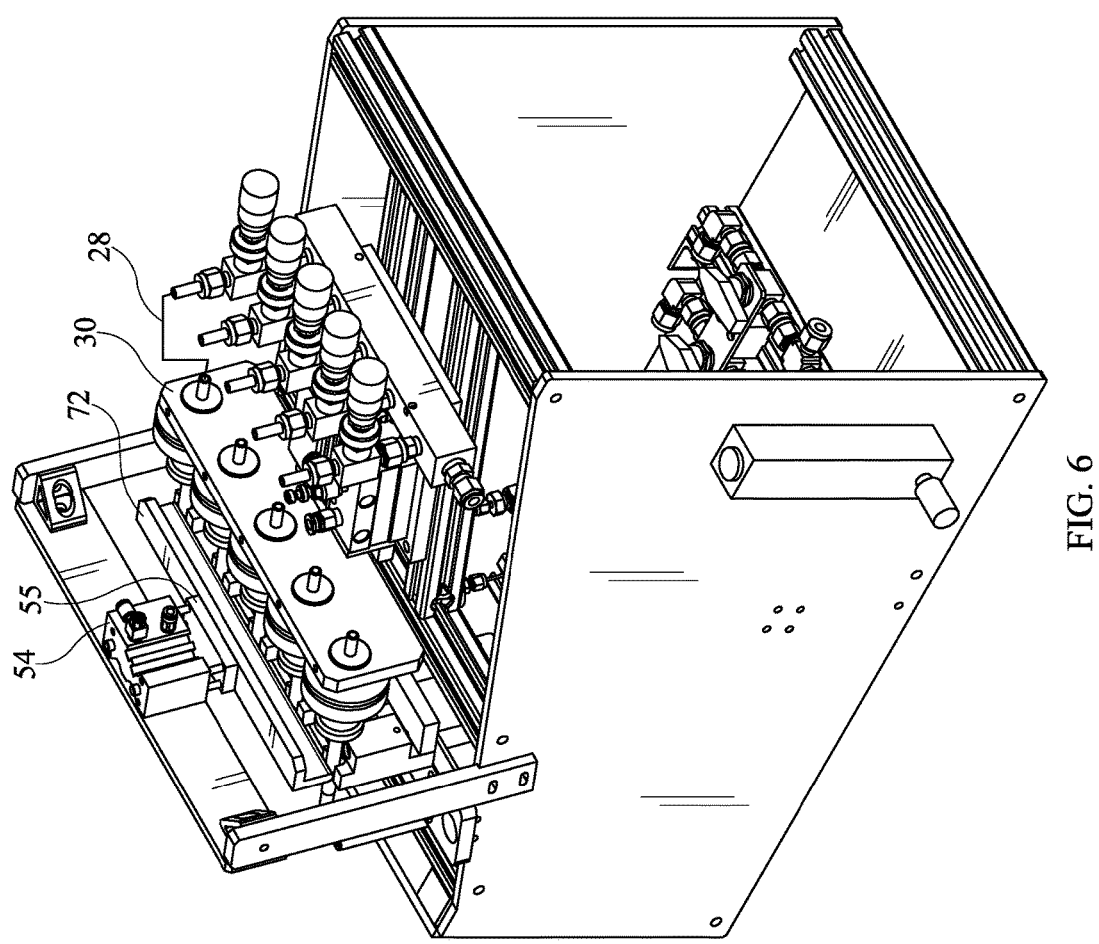
FIG. 6 is a second perspective view of a thumper device in operation in a second position.

With comparison now to FIG. 6, the thumper actuator 54 is shown in an extended position to engage the smoking articles 42. The piston 55 is extended and the thumper bar 72 is shown tapping or thumping the smoking articles 42 for purpose of testing the loosening of a carbon heating element or the breakage of ash. This may occur before or after a preselected volume of air is drawn through the smoking article 42.

As in the previously described actuator embodiment, the actuator 54 may be fluid powered, such as by compressed air or the like. The fluid powered actuator 54 may also be started or stopped by electric solenoid to open or close fluid supply valves.

Due to the movement of actuator 40, the testing stand 10 can have alternate uses other than testing secureness of a heating element or ash breakage. For example, since the smoking article 42 may be moved toward or away from the igniters 44 in some embodiments, the structure may be used to test the lightability of a smoking article. In testing lightability, it is desirable to know how long of a puff or draw is needed to light the tobacco or to light the heat element of a heat not burn smoking article. Alternatively, or additionally, it may be desirable to know how many puffs are required to light such smoking article. The testing stand 10, with the ability to move toward the smoking article or away from the igniters, can be used to determine such.

Figure 7:
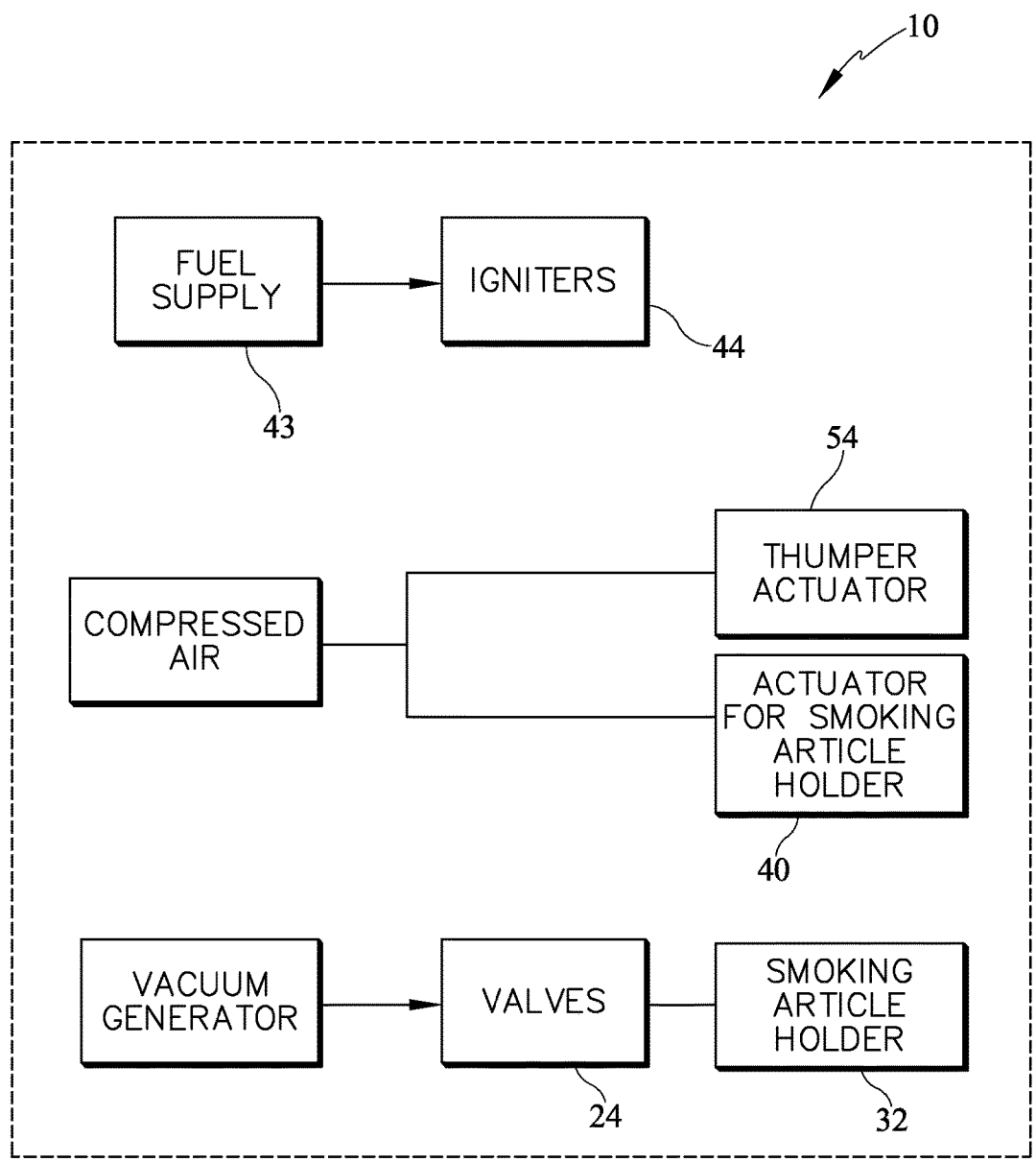
FIG. 7 is a schematic view of the test stand with thumper assembly.

With reference now to FIG. 7, a schematic view of the testing stand with thumping assembly 10 is depicted. The assembly 10 includes a fuel supply 43 in fluid communication with the igniters 42. The igniters 42 ignite the tobacco or a heating element during the testing process. Additionally, a compressed air source is shown as exemplary for fluid power to actuate the actuators 54, 40. The actuators 54, 40 may be of various types as previously indicated. Still further, a vacuum generator is shown. The vacuum generator is in fluid communication with valves 24 and the smoking article holder 32 to place a draw or puff on the one or more smoking articles 42 as part of the testing process.

Figure 8:
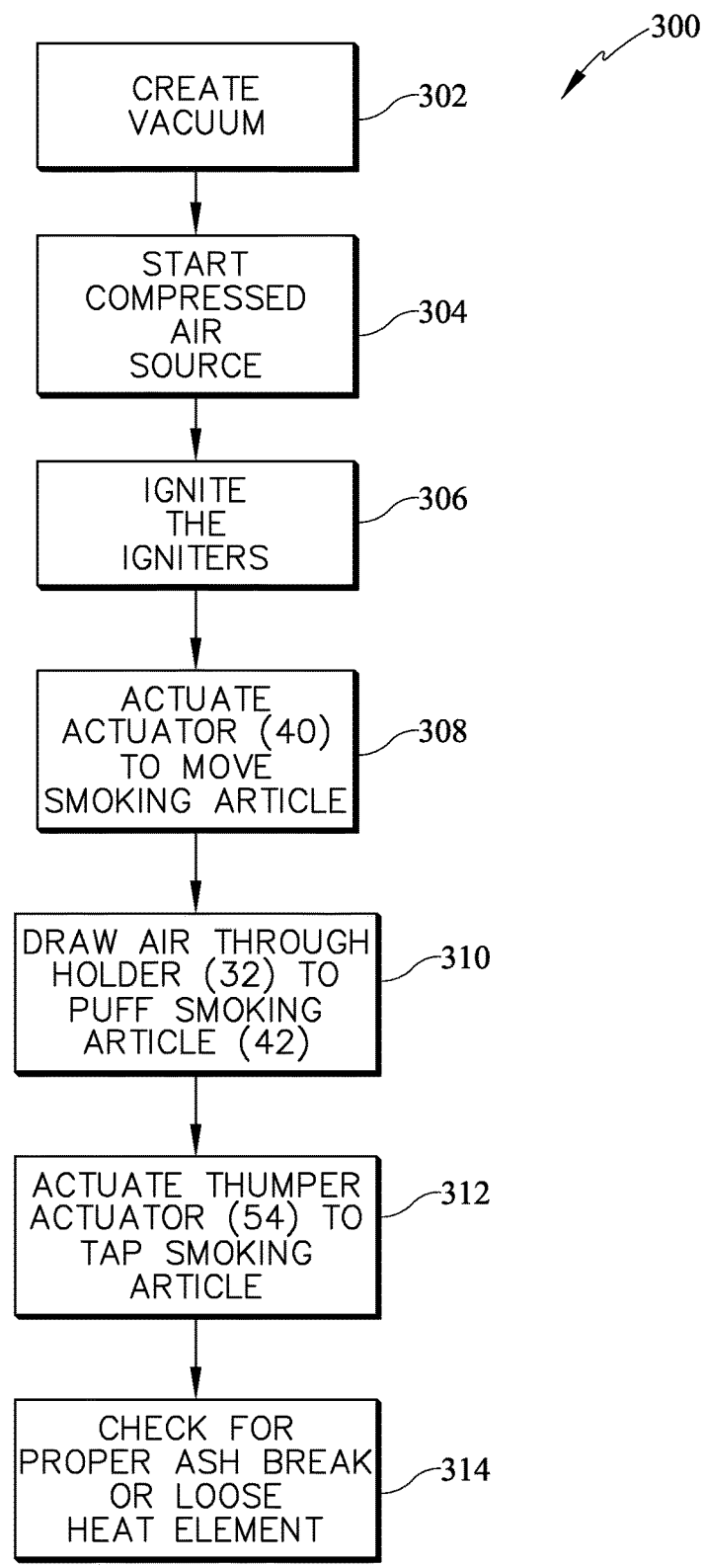
FIG. 8 is a flow chart depicting the process or method of using the test stand with thumper assembly.

With reference now to FIG. 8, a flow chart is shown depicting the operation 300 of the test stand with thumper assembly 10. In operation, the vacuum is created at step 302 with a vacuum generator that is not shown but which may be connected to the valves 24 (FIG. 1). With the vacuum air moving through the valves 24, a compressed air source may be started at step 304. Next the fuel source is provided to the igniters 44 (FIG. 1) and the igniters are ignited at step 306.

After the igniters 44 are ignited, the actuator 40 is actuated at step 308 to either move the smoking article 42 to the igniter 44 or to move the plate 30 toward the smoking article 42. In some embodiments, the smoking article 42 may be engaged by the holder 32 and move with the holder 32 and the seat 60, or alternatively seated in the seat 60, which may be stationary, so that movement of the holder 32 results in engagement with the smoking article.

Next, air is drawn through the holder 32 to puff the smoking article at step 310. This may occur one or more times until the desired volume of air has flowed through the smoking article 42.

Next, at step 312, the thumper actuator 54 taps the smoking article 42 and the smoking article 42 may be checked for loose heating element or proper ash breakage at step 314.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teaching(s) is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising"

can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A smoking article testing assembly, comprising:
a frame;
at least one smoking article holder which holds one or more cigarettes;
at least one valve which is in vacuum communication with said smoking article holder;
an actuator which actuates thumping of a smoking article; and,
a thumper bar operably connected to said actuator, said thumper bar movable to tap an exterior of said one or more smoking articles in said at least one smoking article holder.

2. The smoking article testing assembly of claim 1, said actuator being a linear actuator.

3. The smoking article assembly of claim 1, said actuator being a rotary actuator which produces linear motion.

4. The smoking article testing assembly of claim 1, said actuator being a single acting actuator.

5. The smoking article testing assembly of claim 1, said actuator being a dual acting actuator.

6. The smoking article testing assembly of claim 1, said thumper bar moving at an angle of between 45 degrees and 135 degrees to the smoking articles.

7. The smoking article testing assembly of claim 1, said actuator disposed adjacent to said at least one holder.

8. The smoking article testing assembly of claim 7, further comprising a seat for the smoking article, said seat having a spring for said one or more smoking articles.

9. The smoking article testing assembly of claim 1, said frame having an actuator support.

10. The smoking article testing assembly of claim 9, said actuator support disposed adjacent to said smoking article holder.

11. The smoking article testing assembly of claim 10, said actuator disposed on said actuator support.

12. The smoking article testing assembly of claim 11, said thumper bar moving with movement of said actuator.

13. The smoking article testing assembly of claim 1 wherein said one or more smoking articles are heat not burn tobacco.

14. The smoking article testing assembly of claim 1, wherein said smoking articles are cigarettes.

15. A smoking article testing assembly, comprising:
a frame formed of at least one frame element;
a thumper assembly including a mount and an actuator disposed adjacent to a smoking article holder;
a first flow circuit in flow communication with said smoking article holder for placing a vacuum on a smoking article;
at least one second flow circuit which powers said actuator to thump said smoking article;
said cigarette holder being movable toward or away from an igniter.

16. The smoking article testing assembly of claim 15 further comprising a second actuator to move said cigarette holder.

17. The smoking article testing assembly of claim 16 further comprising a floor which moves with said second actuator.

18. The smoking article testing assembly of claim 17 further comprising a seat for said smoking article disposed on said floor.

19. The smoking article testing assembly of claim 18 wherein actuation of said second actuator moves said seat and said cigarette holder.

20. A smoking article testing assembly, comprising:
a frame having at least one frame element;
a first actuator which moves at least a cigarette holder;
a second actuator which is connected to a thumper bar and thumps an exterior of a smoking article when actuated;
said cigarette holder applying a vacuum to said smoking article;
said at least one frame element guiding movement of said cigarette holder when said first actuator actuates.

* * * * *

UNITED STATES PATENT AND TRADEMARK OFFICE
CERTIFICATE OF CORRECTION

| | |
|---|---|
| PATENT NO. | : 9,903,784 B2 |
| APPLICATION NO. | : 14/789429 |
| DATED | : February 27, 2018 |
| INVENTOR(S) | : Balager Ademe and John Larkin Nelson |

It is certified that error appears in the above-identified patent and that said Letters Patent is hereby corrected as shown below:

In the Specification

Column 3, Line 39 - "testing stand with thumping assembly 10" to be read as "testing stand 10 with the thumping assembly 50".

Column 3, Line 55,56 - "testing stand with thumping assembly 10" to be read as "testing stand 10 with the thumping assembly 50".

Column 3, Line 57,58 - "The testing stand 10 with the thumper assembly" to be read as "The testing 10 with the thumper assembly 50".

Column 3, Line 63 - "the assembly 10" to be read as "the testing assembly 10".

Column 3, Line 66,67 - "the testing stand with thumper assembly 10" to be read as "the testing stand 10 with thumper assembly 50".

Column 4, Line 4 - "the testing stand with thumper assembly 10" to be read as "the testing stand 10 with thumper assembly 50".

Column 4, Line 5,6 - "the testing stand with thumper assembly 10" to be read as "the testing stand 10 with thumper assembly 50".

Column 4, Line 10 - "the testing stand with thumper assembly 10" to be read as "the testing stand 10 with thumper assembly 50".

Column 4, Line 14,15 - "the testing stand with thumper assembly 10" to be read as "the testing stand 10 with thumper assembly 50".

Column 4, Line 21 - "one function of the assembly 10" to be read as "one of the testing assembly 10".

Signed and Sealed this
Fifth Day of February, 2019

Andrei Iancu
*Director of the United States Patent and Trademark Office*

CERTIFICATE OF CORRECTION (continued)
U.S. Pat. No. 9,903,784 B2

Column 5, Line 19 - "the plate 30 are a plurality" to be read as "the plate 30 is a plurality".

Column 5, Line 35 - "the cigarettes 42" to be read as "the smoking article 42".

Column 5, Line 44,45 - "the test stand with thumper assembly 10" to be read as "the test stand 10 with the thumper assembly 50".

Column 5, Line 60 - "more holders 32" to be read as "cigarette holders 32".

Column 6, Line 25,26 - "the test stand with thumper assembly 10" to be read as "the test stand 10 with the thumper assembly 50".

Column 6, Line 29 - "which may disposed on one or more sides" to be read as "which may dispose on one or more sides".

Column 6, Line 30 - "the test stand with thumper assembly 10" to be read as "the test stand 10 with the thumper assembly 50".

Column 6, Line 35 - "the thumper assembly" to be read as "the thumper assembly 50".

Column 7, Line 18,19 - "the testing stand with thumper assembly 10" to be read as "the testing stand 10 with the thumper assembly 50".

Column 7, Line 51,52 - "the testing stand with thumper assembly 10" to be read as "the testing stand 10 with the thumper assembly 50".

Column 7, Line 53 - "The assembly 10 includes a fuel supply" to be read as "The testing assembly 10 includes a fuel supply".

Column 7, Line 65 - "the test stand 10 with thumper assembly" to be read as "the test stand 10 with thumper assembly 50".

Column 9, Line 61 - "the invention has been" to be read as "the invention have been".